United States Patent
Garai et al.

(10) Patent No.: US 12,544,104 B2
(45) Date of Patent: Feb. 10, 2026

(54) SUBCUTANEOUS DEVICE WITH LEAK PREVENTION

(71) Applicant: Medtronic MiniMed, Inc., Northridge, CA (US)

(72) Inventors: Ellis Garai, Woodland Hills, CA (US); Ashwin K. Rao, West Hills, CA (US); Lawrence S. Ring, Simi Valley, CA (US)

(73) Assignee: Medtronic MiniMed, Inc., Northridge (CA)

( * ) Notice: Subject to any disclaimer, the term of this patent is extended or adjusted under 35 U.S.C. 154(b) by 1136 days.

(21) Appl. No.: 17/517,616

(22) Filed: Nov. 2, 2021

(65) Prior Publication Data
US 2023/0140353 A1    May 4, 2023

(51) Int. Cl.
*A61M 5/158* (2006.01)
*A61B 17/34* (2006.01)
*A61M 39/00* (2006.01)
*A61B 17/00* (2006.01)
*A61N 1/372* (2006.01)

(52) U.S. Cl.
CPC .......... *A61B 17/3468* (2013.01); *A61M 39/00* (2013.01); *A61B 2017/00526* (2013.01); *A61B 2017/00951* (2013.01); *A61B 2560/063* (2013.01); *A61M 2039/0081* (2013.01); *A61N 1/372* (2013.01)

(58) Field of Classification Search
CPC .......... A61M 5/158; A61M 2005/1587; A61M 2005/1586; A61M 5/14248; A61M 2005/14252
See application file for complete search history.

(56) References Cited

U.S. PATENT DOCUMENTS

| | | | | |
|---|---|---|---|---|
| 7,129,389 | B1 * | 10/2006 | Watson | A61F 13/0276 602/46 |
| 2007/0185455 | A1 | 8/2007 | Fangrow, Jr. | |
| 2008/0243062 | A1 | 10/2008 | DeStefano et al. | |
| 2018/0318549 | A1 * | 11/2018 | Chiu | A61M 5/14248 |

OTHER PUBLICATIONS

Extended European Search Report, issued by the European Patent Office, dated Mar. 6, 2023, for corresponding European Patent Application No. 22204099.9, 10 pages.

* cited by examiner

*Primary Examiner* — Courtney B Fredrickson
(74) *Attorney, Agent, or Firm* — Foley & Lardner LLP

(57) ABSTRACT

A medical device includes a base having a needle channel and a first surface configured to be secured to a patient's skin. An insertable member is configured to be secured to the base with a length portion of the insertable member extending out of the needle channel at the first surface, for insertion through the patient's skin at an insertion site. A septum extends across the needle channel. The septum has a body through which an insertion needle may be selectively extended to facilitate the subcutaneous insertion of the length portion of the insertable member. The septum provides a liquid seal across the needle channel. The needle channel and the septum provide a sealed volume in which a limited amount of blood or other fluid from the insertion site may be held.

18 Claims, 13 Drawing Sheets

SUBCUTANEOUS DEVICE WITH LEAK PREVENTION

BACKGROUND

The present disclosure relates, in general, to subcutaneous devices such as, but not limited to subcutaneous sensors, infusion sets, injection ports, stimulation devices or other medical devices having at least one subcutaneous interface, and methods of making and using such devices. Particular examples relate to such devices and methods that are configured to reduce or prevent leakage of blood at or around an insertion site.

Certain biological conditions may be monitored or sensed, according to modern medical techniques, through one or more sensors inserted subcutaneously from a medical device. For example, blood glucose levels are commonly monitored with subcutaneous sensors. In addition, certain diseases or conditions may be treated by delivering a medication or other substance to the body of a user, subcutaneously, through an infusion set, injection port or other medical device. For example, diabetes is commonly treated by delivering defined amounts of insulin to the user at appropriate times.

Sensor devices as described herein include one or more subcutaneous sensor probe, needle or cannula that is configured to be inserted under the skin of a patient, to sense or monitor one or more biological conditions.

An infusion set or an injection port device as described herein can be used to facilitate subcutaneous infusion of a medication or other infusion media through one or more cannulas that can be inserted under the skin of the patient. Various examples of other infusions sets are described in U.S. Patent Application Publication No. 2018/0318550 (application Ser. No. 15/973,471; and U.S. Patent Application Publication No. 2020/0384187 (application Ser. No. 16/436,486), each of which is incorporated herein by reference, in its entirety. In some examples, a medical device as described herein may include one or more (or any combination of) sensors, infusion sets, or injection ports.

Sensor devices, infusion sets and injection ports may be configured to secure to (or adjacent) the patient's skin, at an insertion site, where one or more probes, needles or cannulas (or a combination thereof) is inserted through the patient's skin. Some devices operate with an insertion needle that facilitates insertion of the one or more probes, needles or cannulas.

At the time of insertion, or within a few minutes after insertion of an insertion needle, probe, cannula or other needle of some devices, a small amount of blood or other fluid may leak from the insertion site. Typically, such fluid dries on or around the medical device, on the patient's skin or on an adhesive patch under the medical device, within a few minutes. Typically, a small amount of such fluid may not have a negative operational effect on the medical device or a negative biological effect on the patient. However, the blood or other fluid can be unsightly and can scare users, which can result in users prematurely removing the medical devices, or contacting medical staff. Accordingly, various examples of medical devices described herein are configured to reduce or eliminate leakage of blood or other fluid from an injection site.

SUMMARY

A medical device according to certain examples described herein includes a base having a needle channel and a first surface configured to be secured to a patient's skin and an insertable member configured to be secured to the base with a length portion of the insertable member extending out of the needle channel at the first surface, for insertion through the patient's skin at an insertion site. The medical device also includes a septum extending across the needle channel, the septum having a body through which an insertion needle may be selectively extended to facilitate the subcutaneous insertion of the length portion of the insertable member, the septum providing a liquid seal across the needle channel. The needle channel and the septum provide a sealed volume in which a limited amount of blood or other fluid from the insertion site may be held.

In further examples, an adhesive material layer is attached to the first surface of the base, for securing the first surface of the base to the patient's skin. In that example, the base has a second surface facing opposite to the first surface, the needle channel extends through the base from the second surface to the first surface, and the septum is located at least partially in the needle channel at the second surface of the base.

In further examples, an adhesive material layer is attached to the first surface of the base, for securing the first surface of the base to the patient's skin and, in that example, the base has a second surface facing opposite to the first surface, the needle channel extends through the base from the second surface to the first surface, and the septum is located at least partially in the needle channel at the first surface of the base.

In further examples, the septum includes a piercable body having a valve configuration formed therein, for allowing passage of the insertion needle toward the patient's skin and inhibiting passage of fluid into the needle channel.

In further examples, the septum has a first surface that faces the patient's skin at the insertion site when the first surface of the base is secured to the patient's skin, and a first material is held on the first surface of the septum, the first material having at least one of a hydrophilic material, a blood clotting material, or a pain reducing material.

In further examples, the medical device includes an annular body attached to the first surface of the septum and having an opening in alignment with the needle channel in the base, the annual body being impregnated or coated with the first material, or having a layer of the first material.

In further examples, the medical device includes an adhesive material layer attached to the first surface of the base, for securing the first surface of the base to the patient's skin, the adhesive material layer having an opening in alignment with the needle channel in the base; and an annular substrate located within the opening in the adhesive material layer and having an opening in alignment with the needle channel in the base and through which the insertable member extends when the insertable member is inserted through the patient's skin. The annual substrate is impregnated or coated with at least one of a hydrophilic material, a blood clotting material, or a pain reducing material, or having a layer of at least one of a hydrophilic material, a blood clotting material, or a pain reducing material that at least partially surrounds the insertion site.

In further examples, the medical device includes an annular adhesive material layer provided on one side of the annular substrate for adhering the annular substrate to the first surface of the base.

In further examples, the medical device includes an adhesive material layer attached to the first surface of the base, for securing the first surface of the base to the patient's skin, the adhesive material layer having an opening in alignment with the needle channel in the base; and an annular substrate located within the opening in the adhesive material layer and having an opening in alignment with the needle channel in the base and through which the insertable member extends when the insertable member is inserted through the patient's skin. A layer of gauze or other blood absorbing material is attached to a skin-facing surface of the annular substrate.

In further examples, the medical device includes an annular adhesive material layer provided on a side of the annular substrate opposite to the skin-facing side for adhering the annular substrate to the first surface of the base, the annular adhesive material having an opening in alignment with the channel in the base.

In further examples, the septum comprises a piercable body.

In further examples, the insertable member comprises one or more of a sensor probe, a cannula, a needle, or an electrical stimulus delivery device.

Further examples relate to a medical device including a base having a needle channel and a first surface configured to be secured to a patient's skin. An adhesive material layer is attached to the first surface of the base, for securing the first surface of the base to the patient's skin, the adhesive material layer having an opening in alignment with the needle channel in the base. An insertable member is configured to be secured to the base with a length portion of the insertable member extending out of the needle channel at the first surface and through the opening in the adhesive material layer, for insertion through the patient's skin at an insertion site. The medical device further includes an annular substrate located within the opening in the adhesive material layer and having an opening in alignment with the needle channel in the base and through which the insertable member extends when the insertable member is inserted through the patient's skin. The annual substrate is impregnated or coated with a first material, has a layer of the first material, or is attached to a layer of gauze or other absorbent material, that at least partially surrounds or covers the insertion site, and wherein the first material comprises at least one of a hydrophilic material, a blood clotting material, or a pain reducing material.

In further examples, the medical device includes a septum located in the needle channel, wherein the needle channel and the septum provide a sealed volume in which a limited amount of blood or other fluid from the insertion site may be held.

In further examples, that septum includes a piercable body.

In further examples, that medical device includes an annular adhesive material layer provided on one side of the annular substrate for adhering the annular substrate to the first surface of the base.

In further examples, that insertable member includes one or more of a sensor probe, a cannula, a needle, or an electrical stimulus delivery device.

Further examples relate to a method of making a medical device, including providing a base having a needle channel and a first surface configured to be secured to a patient's skin, and securing an insertable member to the base with a length portion of the insertable member extending out of the needle channel at the first surface, for insertion through the patient's skin at an insertion site. The method further includes extending a septum across the needle channel, the septum having a body through which an insertion needle may be selectively extended to facilitate the subcutaneous insertion of the length portion of the insertable member, the septum providing a liquid seal across the needle channel. The needle channel and the septum provide a sealed volume in which a limited amount of blood or other fluid from the insertion site may be held.

Further examples of that method include attaching an adhesive material layer to the first surface of the base, for securing the first surface of the base to the patient's skin, where the base has a second surface facing opposite to the first surface, and the needle channel extends through the base from the second surface to the first surface.

Further examples of the method include attaching an adhesive material layer to the first surface of the base, for securing the first surface of the base to the patient's skin, the adhesive material layer having an opening in alignment with the needle channel in the base, and attaching an annular substrate within the opening in the adhesive material layer. In that example, the annular substrate has an opening in alignment with the needle channel in the base and through which the insertable member extends when the insertable member is inserted through the patient's skin. The method further includes coating the annular substrate with at least one of a hydrophilic material, a blood clotting material, or a pain reducing material, or supporting a layer of at least one of a hydrophilic material, a blood clotting material, or a pain reducing material on the annular substrate to at least partially surrounds the insertion site.

BRIEF DESCRIPTION OF THE DRAWINGS

The above and other aspects and features of the present invention will become more apparent to those skilled in the art from the following detailed description of the example embodiments with reference to the accompanying drawings, in which.

DETAILED DESCRIPTION

Figure 1:
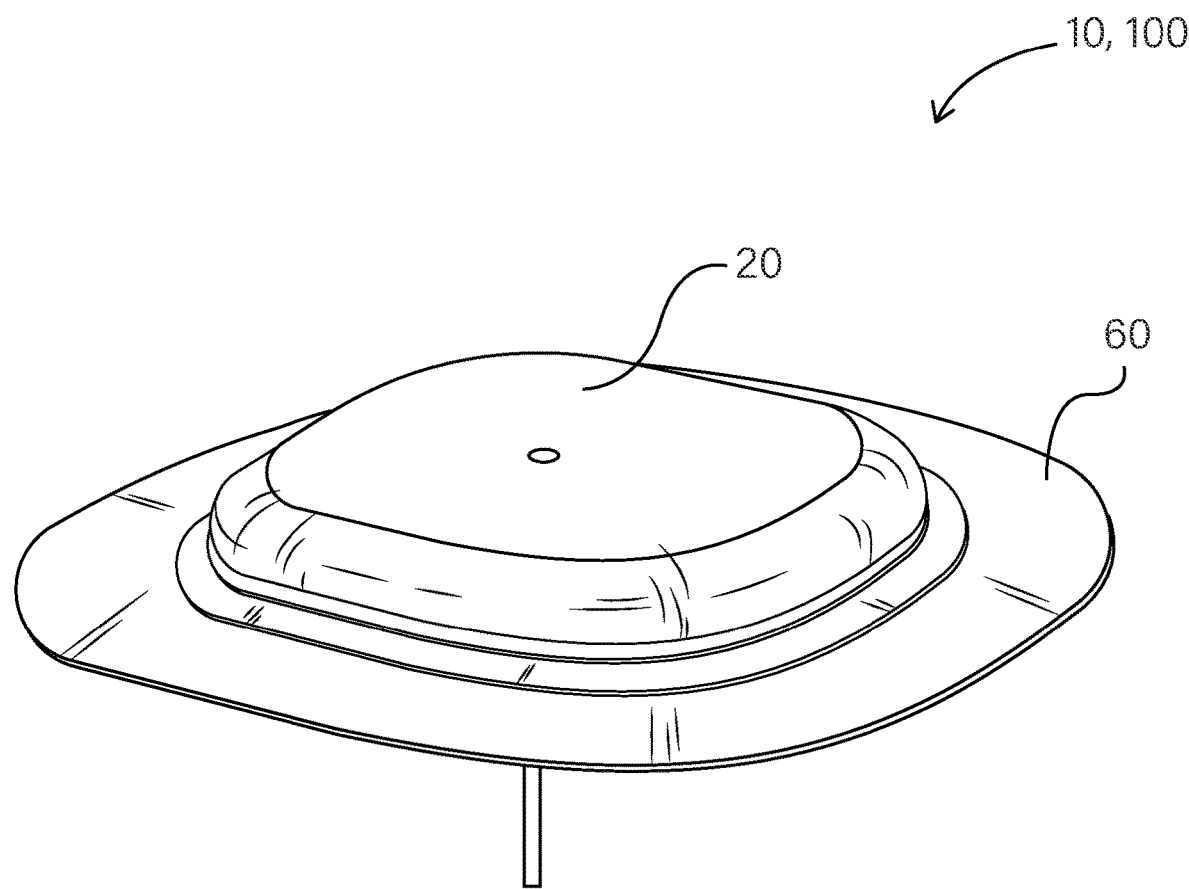
FIG. 1 is a perspective view of an example of a medical device.

Hereinafter, example embodiments will be described in more detail with reference to the accompanying drawings. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated. Further, features or aspects within each example embodiment should typically be considered as available for other similar features or aspects in other example embodiments.

Certain terminology may be used in the following description for the purpose of reference only, and thus are not intended to be limiting. For example, terms such as "top", "bottom", "upper", "lower", "above", and "below" could be used to refer to directions in the drawings to which reference is made. Terms such as "front", "back", "rear", "side", "outboard", and "inboard" could be used to describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

It will be understood that when an element or feature is referred to as being "on," "secured to," "connected to," or "coupled to" another element or layer, it can be directly on, connected to, or coupled to the other element or feature, or one or more intervening elements or features may be present. In addition, it will also be understood that when an element or features is referred to as being "between" two elements or features, it can be the only element or feature between the two elements or features, or one or more intervening elements or features may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Example embodiments relate to sensor devices, infusion devices, infusion sets, injection ports, insertion sets, media delivery systems, simulation devices, combinations thereof, or other medical devices and systems (each generally referred to herein as a medical device or medical system) that include or operate with one or more subcutaneously insertable probe, cannula, needle, or the like (or a combination thereof).

In some examples, the medical device includes one or more sensor probes, cannulas or needles (or a combination thereof) that are connected to sensor electronics, and that are configured to convey electrically detectable signals or fluid from a subcutaneous site to the sensor electronics. In some examples, the medical device includes one or more probes or other electrical output devices that are connected to a stimulus signal source to convey one or more electrical stimulus signals to a subcutaneous site.

In some examples, the medical device includes one or more cannulas or needles in fluid flow communication with one or more fluid flow conduits. Such devices may include infusion devices or infusion sets that are configured to connect (or are connected) through one or more fluid flow tubing to an infusion media source (such as, but not limited to a reservoir containing an infusion media, a controlled infusion media pump, or the like), to provide individual, intermittent or continuous delivery of infusion media. In particular examples, the medical device includes an infusion set or of an injection port to permit multiple injections of medication into a patient without the need to re-puncture the patient's skin. In those examples, medication may be injected from a standard medical implement (such as, but not limited to a syringe), through a septum on the medical device, for subcutaneous delivery through the one or more cannulas or needles of the medical device. Other examples relate to methods of making and using such medical devices and medical systems.

An example of a medical device 10 is shown in a top, perspective view in FIG. 1. The medical device 10 is shown in a cross-section, schematic view in FIG. 2, attached to an epidermal surface S. The medical device 10 includes a base 20 and a subcutaneously insertable member 30. The insertable member 30 may include a probe, a needle, a cannula, or the like. The subcutaneously insertable member 30 has a distal end 30a that is configured to be inserted through the epidermal surface S, to a subcutaneous location. The medical device 10 example in FIGS. 1 and 2 includes one subcutaneously insertable member 30. Other examples may include more than one (a plurality of) subcutaneously insertable member(s) 30.

In certain examples, the base 20 may include a housing having an interior which contains one or more components 40 connected to the insertable member 30 (e.g., at a proximal end of the insertable member, opposite to the distal end 30a). In examples in which the medical device 10 is or includes a sensor, the components 40 may include one or more sensor electronics connected to the insertable member 30, where the insertable member 30 is configured to deliver one or more electrical signals, fluids or combinations thereof to the sensor electronics. In other examples, the components 40 may include wireless electrical transmitters or other communication electronics, or electrical ports that are configured to communicate with or connect to sensor electronics (not shown) located external to the base 20.

In examples in which the medical device 10 is or includes an electrical stimulating device, the components 40 may include one or more electrical stimulus source connected to the insertable member 30, where the insertable member 30 is configured to deliver electrical stimulus signals subcutaneously. In examples in which the medical device 10 is or includes an infusion device, an infusion set, an injection port, or another media delivery system, the components 40 may include one or more (or a combination of) an infusion media reservoir containing an infusion media, an infusion media pump connected to a reservoir, or a fluid inlet or outlet port. In other examples, the components 40 may be omitted and the proximal end of the insertable member 30 may be located within the base 20, in fluid flow communication with an internal channel or volume 20a of the base 20.

The base 20 may include a single-part structure, or may be made of multiple parts (such as, but not limited to a bottom part and a top part that connect together in a clam-shell configuration). The base 20 may be made of any suitable material or materials having sufficient rigidity and strength to function in the manner described herein including, but not limited to plastic, metal, ceramic, composite material, or combinations thereof.

The base 20 includes an internal channel or volume 20a, a first surface 20b that is configured to face the epidermal surface S during use, and a second surface 20c facing opposite the first surface 20b. In the example in FIG. 2, the internal channel or volume 20a extends from the first surface 20b to the second surface 20c and is open at the first surface 20b. The internal channel or volume 20a is covered and sealed by a septum 50 at the second surface 20c.

In some examples, an adhesive material layer 60 is secured to the first surface 20b of the base 20 (the downward-facing side in FIGS. 1 and 2) and has an adhesive material that may be selectively exposed to adhere the base 20 to the epidermal surface S, at a desired infusion site. The adhesive material layer 60 may be secured to the base 20 by any suitable securing mechanism including, but not limited to a glue or other bonding agent, thermal bonding, sonic welding, or the like.

In certain examples, a backing or release material layer (not shown) is adhered to the adhesive material layer 60 to cover and protect the adhesive material layer 60 from exposure to dirt or other environmental contaminants before adhering the base 20 to a patient's skin. In those examples, the release material layer is selectively removable from the adhesive material layer 60 to expose the adhesive material for adhering the base 20 to the epidermal surface S. In other examples, the adhesive material layer 60 and the release material layer may be omitted from the system 10. Alternatively or in addition, in further examples, the base 20 may include other suitable mechanisms for securing the base 20 to a patient's skin including, but not limited to bands, straps, sutures, suture eyelets for receiving sutures, or combinations thereof.

The insertable member 30 is connected to and supported by the base 20, for example, in the channel or volume 20a of the base 20. In certain examples, the proximal end of the insertable member 30 is connected to the base 20 and (or) to components 40 in the base 20. In other examples, the proximal end of the insertable member 30 includes a collar that is received in and secured to the channel or volume 20a, such that the proximal end of the insertable member 30 terminates in the channel or volume 20a and connects in electrical communication with components 40 through a further electrical connection extending into the channel or volume 20a. Alternatively, the proximal end of the insertable member 30 and collar may terminate in the channel or volume 20a and be in fluid flow communication with the channel or volume 20a and (or) with other components (not shown) that may be inserted through the septum 50 into the channel or volume 20a.

When in the inserted state, the insertable member 30 extends through an open end of the channel or volume 20a at the first surface 20b of the base 20, and into the epidermal surface S at an insertion site I. The open end of the channel or volume 20a faces the insertion site I and allows the insertable member 30 to extend out from the base 20, into the epidermis of a patient. The open end of the channel or volume 20a faces and aligns with an opening through the adhesive material layer 60. The adhesive material layer 60 forms a liquid seal around the open end of the channel or volume 20a.

The septum 50 is secured to the base 20, to cover and seal the other end of the channel or volume 20a. Accordingly, the wall of the channel or volume 20a, the wall of the aligned opening through the adhesive material layer 60, and the septum 50 provide a sealed volume over the epidermal surface S, at the insertion site. Therefore, if a limited amount of blood is excreted from the injection site (e.g., during or after insertion), that blood may be received, trapped and held within the channel or volume 20a. Accordingly, the limited excreted amount of blood can remain out of view from outside of the device 10.

Figure 2:
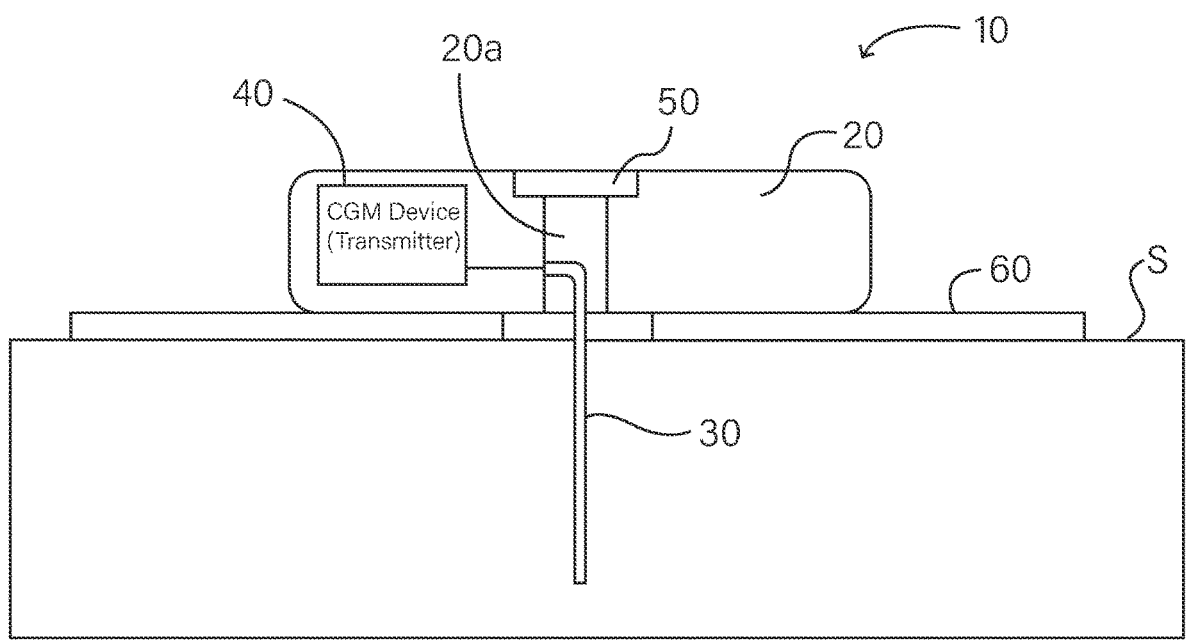
FIG. 2 is a cross-section view of the medical device of FIG. 1.

The septum 50 may be secured to the base 20 by any suitable securing mechanism including, but not limited to molding, co-molding with the top portion of the base 20, adhesive, bonding, thermal bonding, sonic welding, or the like. The septum 50 may be secured to the base 20 so as to be generally flush with the second surface 20c of the base 20, as shown in FIG. 2. In those examples, the septum 50 may be secured within an annular recess around the open end of the channel or volume 20a, at the second surface 20c. In other examples, the septum 50 may be recessed within the second surface 20c or may extend partially or fully out from the second surface 20c.

The septum 50 and the end of the channel or volume 20a covered by the septum 50 provide a port for receiving an insertion needle for facilitating inserting the insertable member 30 through the epidermal surface S. Alternatively or in addition, the septum 50 and the end of the channel or volume 20a covered by the septum 50 may provide a port for receiving a needle, cannula, catheter or fluid connector member, in fluid flow communication with the channel or volume 20a (or with the insertable member 30).

The medical device 10 shown in FIG. 1 may be packaged for use in a sterile container. The base 20 may be removed from the container and secured to the epidermal surface S at the insertion site I, through the adhesive material layer 60 (or other securing mechanisms as described herein). For example, the user may peel off the cover layer over the adhesive material layer 60 to expose the adhesive. The user may apply the exposed adhesive (and the base 20) on the epidermal surface S, over a desired insertion site I, to secure the base 20 (or the bottom portion of the base 20) to the epidermal surface S. The user may insert the insertable member 30 into the epidermal surface S, through the channel or volume 20a of the base 20 (or of the bottom portion of the base 20). In some examples, the insertable member 30 is inserted by supporting the insertable member 30 on an insertion needle or within a hollow insertion needle, and moving the insertion needle (and the insertable member 30 thereon) through the septum 50, through the channel 20a, and through the epidermal surface S, with an insertion tool.

When moved to the inserted state, the insertable member 30 (or the collar of the insertable member 30) may engage and lock with the base 20, to secure the insertable member 30 to the base 20. Then, with the insertable member 30 inserted to a desired insertion position, the insertion needle may be withdrawn, leaving the insertable member 30 in the inserted state. However, the insertion site I is covered by a volume in the base 20 that is sealed by the septum 50. Accordingly, if a limited amount of blood is excreted at the insertion site I, the blood will be trapped within the volume defined by the wall of the channel 20a, the septum 50 covering the channel 20a and the wall of the opening in the adhesive material layer 60, and will be inhibited from leaking out to a visible portion of the medical device 10.

Figure 3:
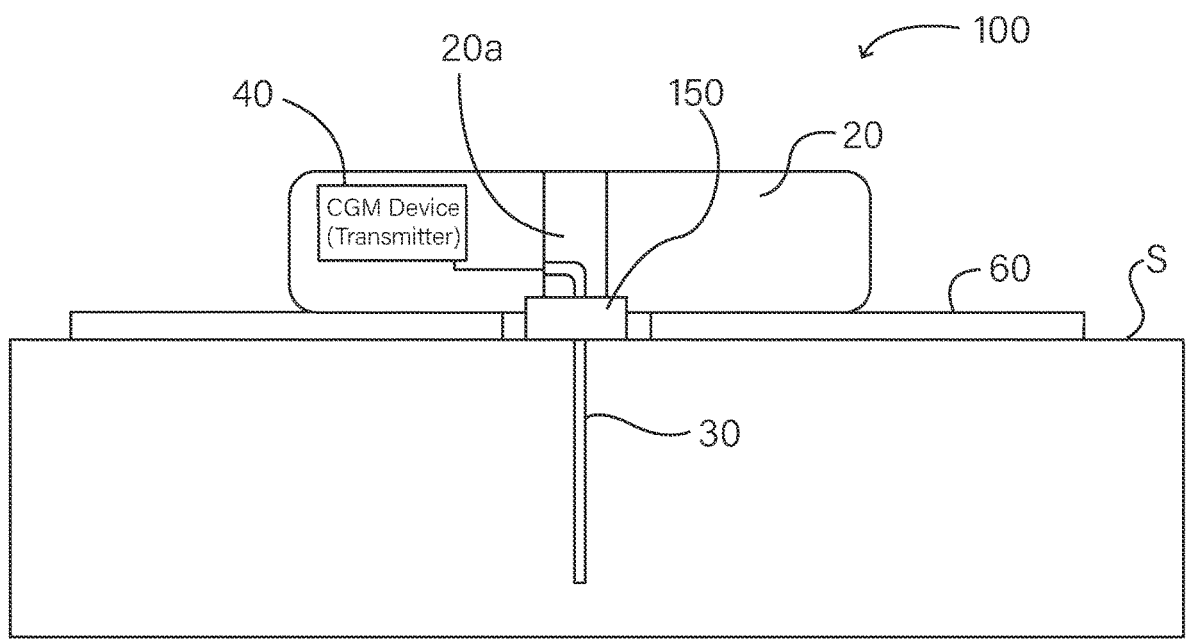
FIG. 3 is a cross-section view of another example of a medical device.

Another example of a medical device 100 is shown in FIG. 3. The medical device 100 includes certain features corresponding to those described above for the medical device 10. The medical device 100 operates in a manner similar to the manner of operation of the medical device 10 described above. Accordingly, corresponding features are labeled with corresponding reference numbers, for which the above description applies, including the base 20, the channel or volume 20a, the insertable member 30, the components 40, and the adhesive material layer 60. However, in the medical device 100, the septum 50 is omitted and, instead, a septum 150 is provided at the first surface 20b of the base 20. The septum 150 may be made of a material corresponding to the materials described for the septum 50. Also, the septum 150 may be secured to the base 20 in any suitable manner including, but not limited to those described with regard to the septum 50.

In the example in FIG. 3, the septum 150 is molded or otherwise attached to the base 20, and is located within the opening in the adhesive material layer 60. The septum 150 is configured to be placed directly over the insertion site I, when the base 20 is secured to the epidermal surface S. In particular examples, the skin-facing surface of the septum 150 and of the adhesive material layer 60 are generally co-planar, or the skin facing surface of the septum 150 extends toward the epidermal surface S further than the skin facing surface of the adhesive material layer 60, such that skin facing surface of the septum 150 is abutted against, or is slightly pressed or forced against the epidermal surface S, when the adhesive material layer 60 is adhered to the epidermal surface S. By abutting against, or by being pressed or forced against the injection site I, the septum 150 can provide a seal to prevent or reduce excretion of blood from the insertion site I.

In further examples of the medical device 100 in FIG. 3, a septum 50 is provided on the base 20, at the second surface 20c of the base (as described above with regard to FIG. 2), in addition to the septum 150 at the first surface 20b of the base. In yet other examples the septum 50 or the septum 150 may be secured to the base 20, within the channel 20a, at a location separated from and between the first surface 20b and the second surface 20c of the base.

In certain examples, the septum 50 or 150 may be a piercable septum, made of a material that is configured to be pierced by a needle or cannula. In other examples, the septum 50 or 150 is a pre-pierced, septum that has one or more slits, holes or cuts formed through the septum material. A pre-pierced septum can help to reduce leakage by limiting piercing location on the septum. In those or other examples, the septum 50 or 150 may be configured as a self-sealing septum, for example, made of a substantially resilient material biased toward a sealed position. In some examples, the septum 50 or 150 is made of a molded disc of silicon, polyurethane or other appropriate material which can be molded to or otherwise secured to a wall or walls of the channel or volume 20a of the base 20.

Figure 4:
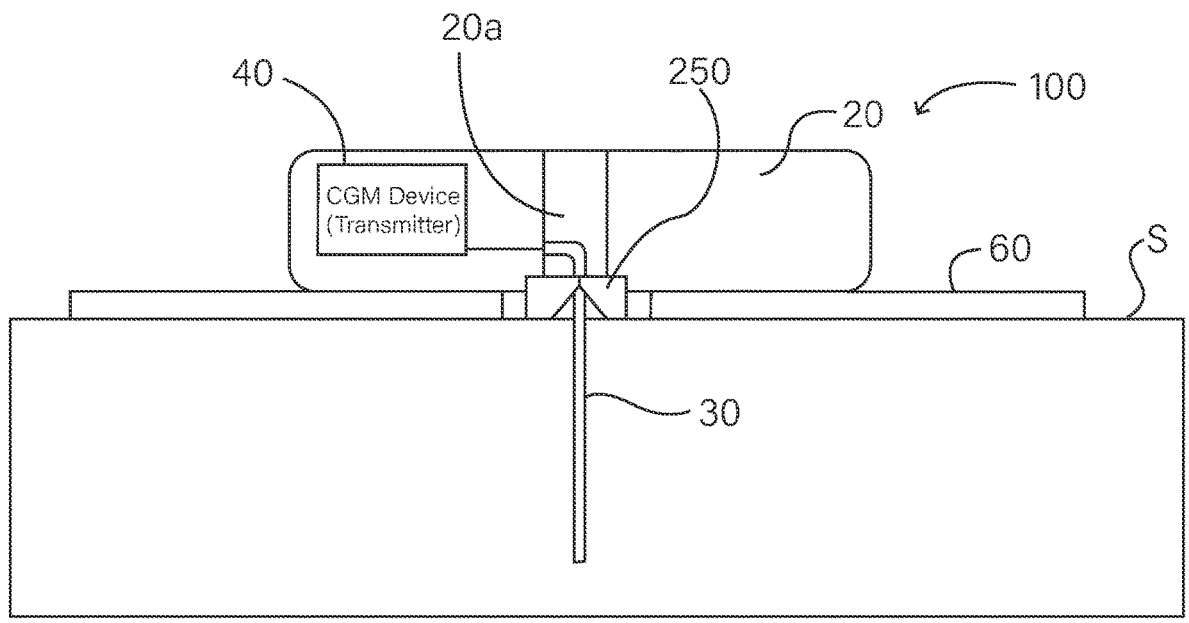
FIG. 4 is a cross-section view of another example of the medical device of FIG. 3.

In particular examples, the septum 50 or the septum 150 may include a duckbill valve, other valve or other configuration that allows passage of the insertable member 30, but also helps to prevent or reduce leakage. For example, FIG. 4 shows the medical device 100 described above, but with a septum 250 that has a shape to form a one-way valve. The septum 250 has a cone-shaped recess on one side (the skin-facing side) and a pre-formed slit through the septum at the apex of the cone-shaped recess. The pre-formed slit and cone-shaped recess allow the insertable member 30 to be easily inserted through the septum 250, from the upper side, toward the skin-facing side of the septum. In particular examples, the preformed slit provides a small self-sealing opening or flap at the apex of the cone-shaped recess, through which the insertable member 30 may be extended.

In particular examples, the septum 150 may include or operate with a coating, layer, ring or the like, made of or carrying a drug or other substance. In other examples, the septum 150, itself, may be impregnated with a drug or other substance. In certain examples, the drug or other substance may include one or more of a hydrophilic material, a blood clotting material, a pain reducing material, or combinations thereof. In certain examples, the hydrophilic material comprises a hydrophilic polymer with potassium salt or Kaolin. In certain examples, substances that promote blood clotting may include Antifibrinolytic drugs such as, but not limited to aprotinin, tranexamic acid (TXA), epsilon-aminocaproic acid, aminomethylbenzoic acid, or other the like.

Figure 5:
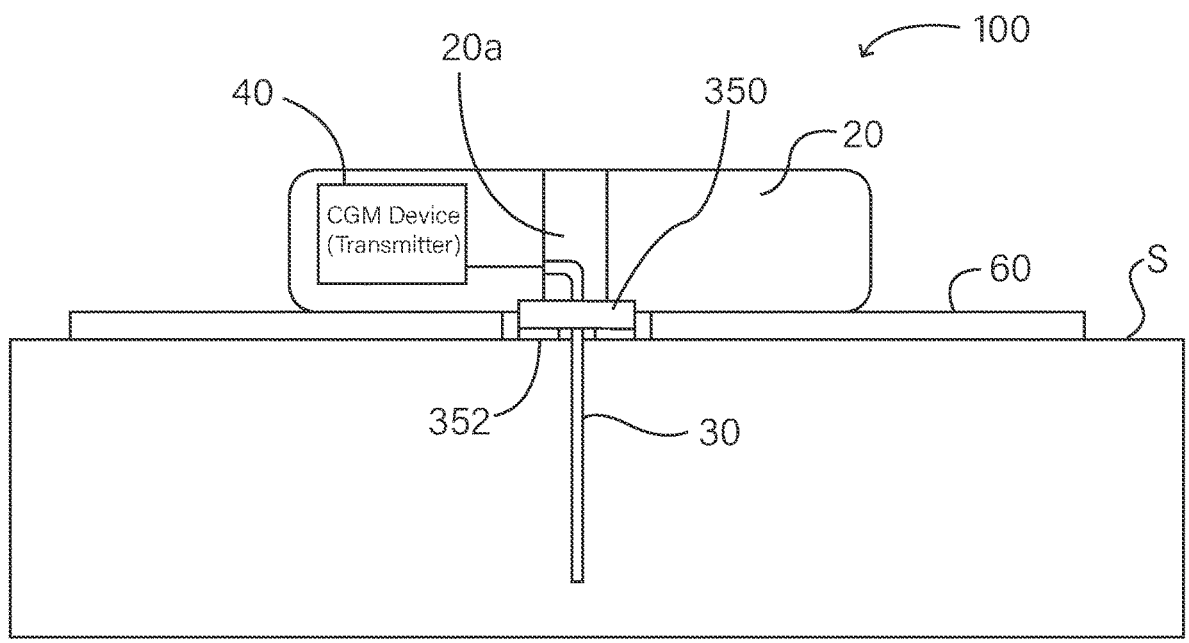
FIG. 5 is a cross-section view of another example of the medical device of FIG. 3.
Figure 6:
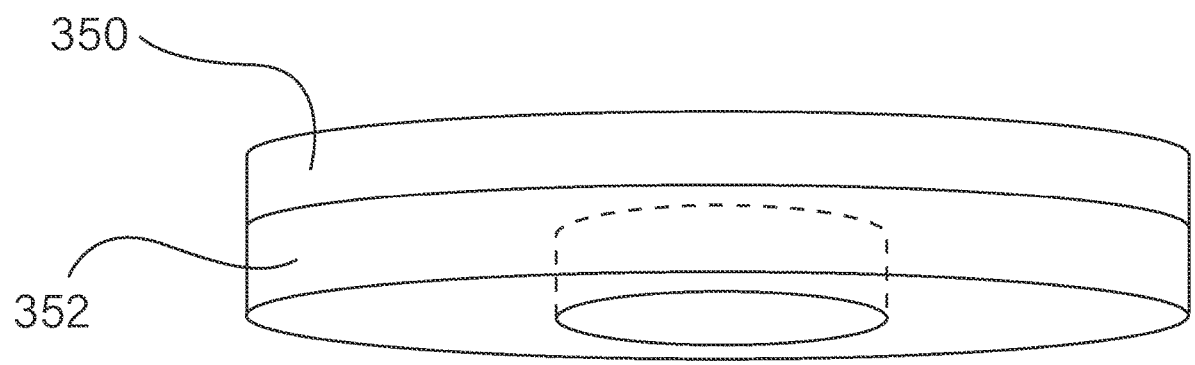
FIG. 6 is a perspective view of an example of a septum and a drug-carrying ring of the medical device of FIG. 5.

For example, FIG. 5 shows the medical device 100 described above, but with a septum 350 having skin facing surface to which a drug-carrying ring 352 is attached. The septum 350 may correspond to the septum 150 or to the septum 250 described above, however, with the drug-carrying ring 352 attached thereto. In certain examples, the septum 350 and the drug-carrying ring 352 may be configured as a unit, as shown in FIG. 6, and then secured (as a unit) to the base 20 as shown in FIG. 5.

The drug-carrying ring 352 may include a foam, gauze, sponge or other absorbent material that is impregnated with one or more drugs or other substances as discussed above. In other examples, the drug-carrying ring 352 is a non-absorbant material that is made of or coated with one or more drugs or other substances as discussed above. In particular examples, the drug-carrying ring 352 has a central opening through which the insertable member 30 extends, such that the drug-carrying ring 352 surrounds the insertable member 30 at the insertion site I. In other examples, the drug-carrying ring 352 may be replaced with one or more ring sections or partial rings that partially surround the insertable member 30 at the insertion site I. The drug-carrying ring 352 may be attached to the septum 350 by any suitable securing mechanism including, but not limited to molding, co-molding with the septum 350, adhesive, bonding, thermal bonding, sonic welding, or the like.

In the example in FIG. 5, the upper end of the channel or volume 20a of the base 20 is open, to selectively receive an insertion needle as described above. In other examples, the upper end of the channel or volume 20a in the example of FIG. 5 may be covered with a septum 50 as described above with regard to FIG. 2.

Figure 7:
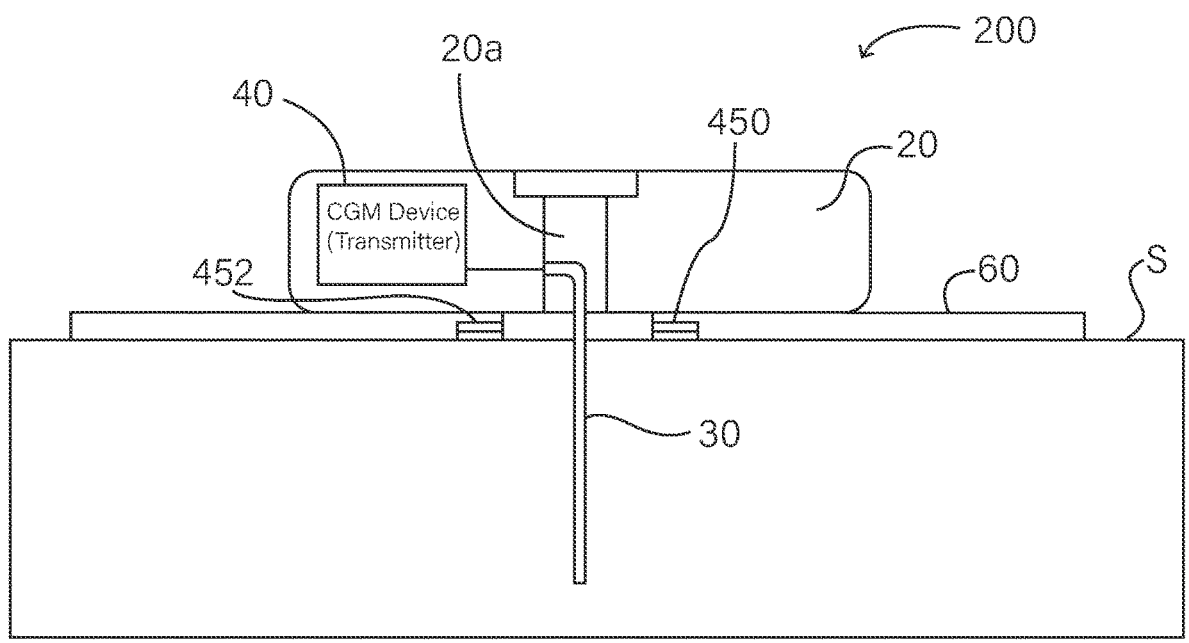
FIG. 7 is a cross-section view of another example of the medical device of FIG. 3.

In further examples, the adhesive material layer 60 may include or operate with a coating, layer, ring or the like, made of or carrying a drug or other substance as described above. For example, FIG. 7 shows the medical device 200 as described above with regard to the medical device 10 or the medical device 100, but with no septa 50, 150, 250, or 350. However, in FIG. 7, a substrate 450 and a drug-carrying ring 452 are provided on or in the skin facing surface of the adhesive material layer 60. The substrate 450 may be an annular body forming a ring shape that corresponds to the diameter and shape of the drug-carrying ring 452. The substrate 450 may be made of any suitably rigid material including, but not limited to a polyimide, PET or other suitable material. In other examples, the substrate 450 may be omitted and the drug-carrying ring 452 may be secured directly to the adhesive material layer 60 or to the first surface 20c of the base 20. The drug-carrying ring 452 may be made of a material similar to that described above with regard to drug-carrying ring 352, and may carry a drug or other substance as described above.

Figure 8:
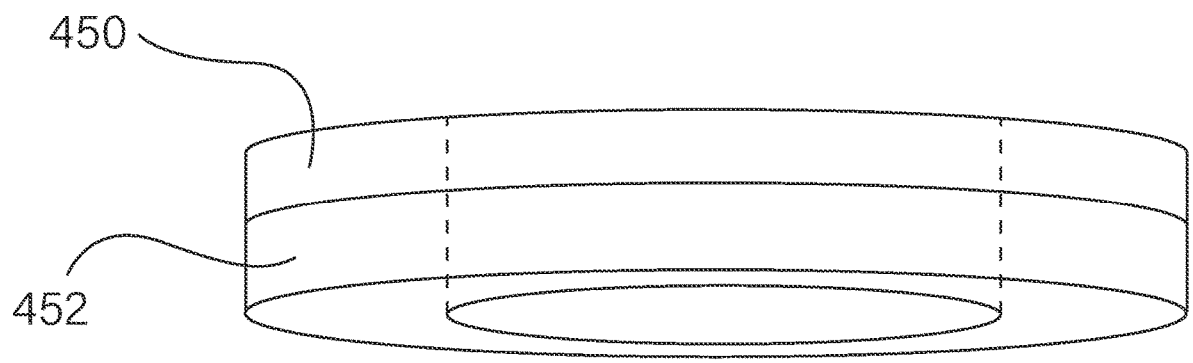
FIG. 8 is a perspective view of an example of a drug-carrying ring of the medical device of FIG. 7.

In particular examples, the substrate 450 and the drug-carrying ring 452 have central openings that align with each other and with the open end of the channel 20a, and through which the insertable member 30 extends. Accordingly, the substrate 450 and the drug-carrying ring 452 surround the insertable member 30 at the insertion site I. In other examples, the substrate 450 and the drug-carrying ring 452 may be replaced with one or more ring sections or partial rings that partially surround the insertable member 30 at the insertion site I. The drug-carrying ring 452 may be attached to the substrate 450 by any suitable securing mechanism including, but not limited to molding, co-molding with the substrate, adhesive, bonding, thermal bonding, sonic welding, or the like. In certain examples, the substrate 450 and the drug-carrying ring 452 may be configured as a unit, as shown in FIG. 8, and then secured (as a unit) to the base 20, as shown in FIG. 7. The substrate 450 (or the drug-carrying ring 452) may be attached to the adhesive material layer 60 by any suitable securing mechanism including, but not limited to adhesive, bonding, thermal bonding, sonic welding, or the like.

In the example in FIG. 7, the upper end of the channel or volume 20a of the base 20 is open, to selectively receive an insertion needle as described above. In other examples, the upper end of the channel or volume 20a in the example of FIG. 7 may be covered with a septum 50 as described above with regard to FIG. 2. Also, in the example in FIG. 7, the lower end of the channel or volume 20a of the base 20 is open to the channel or volume 20a as described above. In other examples, the lower end of the channel or volume 20a in the example of FIG. 7 may be covered with a septum 150, 250 or 350 as described above.

Figure 9:
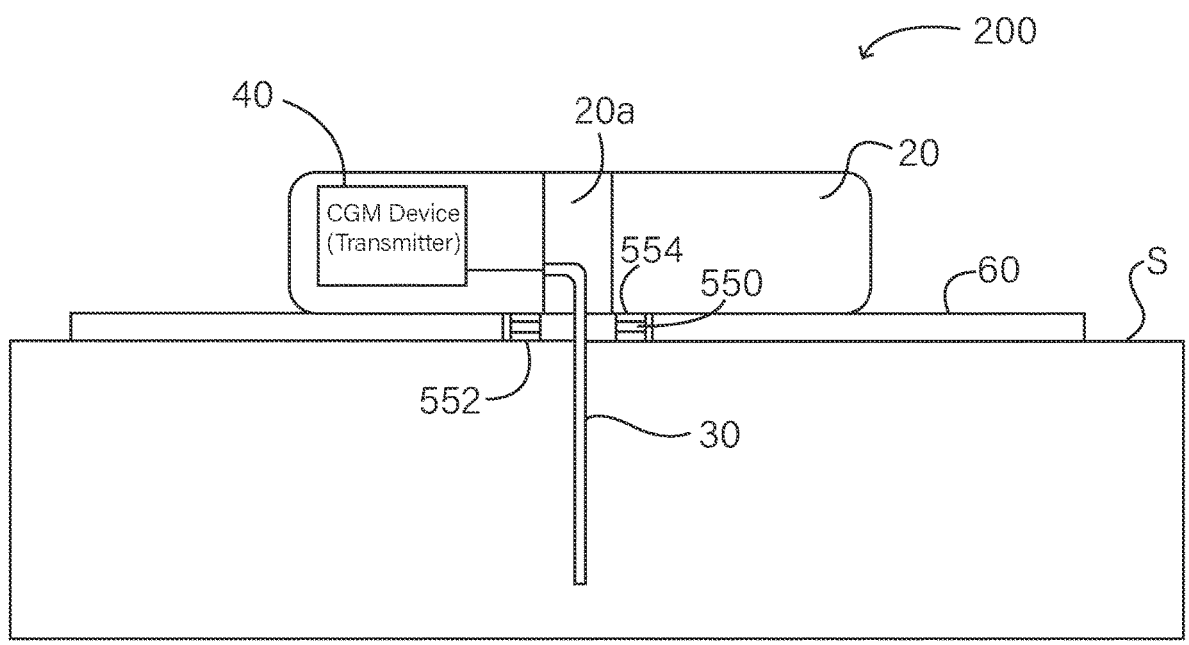
FIG. 9 is a cross-section view of another example of the medical device of FIG. 3.

In further examples, a coating, layer, ring or the like, made of or carrying a drug or other substance as described above, may be attached to or provided on the first surface 20a of the base 20. For example, FIG. 9 shows the medical device 200 as described above with regard to the medical device 10 or the medical device 100, but with no septa 50, 150, 250, or 350. However, in FIG. 8, a substrate 550 and a drug-carrying ring 552 are secured to the skin-facing surface 20a of the base 20. In FIG. 9, the substrate 550 is arranged between the drug-carrying ring 552 and a layer of adhesive 554 such as, but not limited to a double-sided pressure sensitive adhesive, a glue, or another adhesive material, for adhering the substrate 550 to the first surface 20a of the base 20. In other examples, the substrate 550 may be attached to the first surface 20a by other securing mechanisms such as, but not limited to another bonding agent, thermal bonding, sonic welding, or the like.

In particular examples, the substrate 550, the drug-carrying ring 552, and a layer of adhesive 554 may each include an annular body forming a ring shape with corresponding diameters. The substrate 550 may be made of any suitably rigid material including, but not limited to a polyimide, PET or other suitable material. In other examples, the substrate 550 may be omitted and the drug-carrying ring 552 may be secured directly to the layer of adhesive 554. The drug-carrying ring 552 may be made of a material similar to that described above with regard to drug-carrying ring 352, and may carry a drug or other substance as described above.

Figure 10:
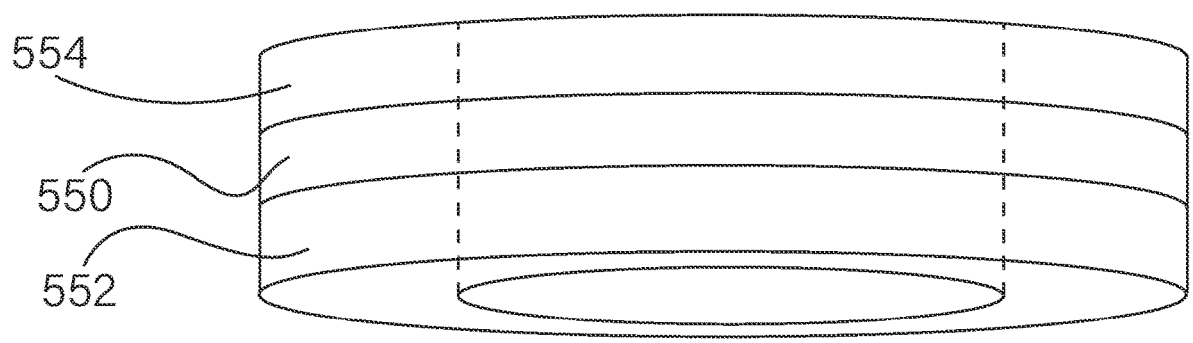
FIG. 10 is a perspective view of an example of a drug-carrying ring of the medical device of FIG. 9.

In particular examples, the substrate 550, the drug-carrying ring 552 and the layer of adhesive 554, each have a central opening that aligns with each other and with the open end of the channel 20a, and through which the insertable member 30 extends. Accordingly, the substrate 550, the drug-carrying ring 552 and the layer of adhesive surround the insertable member 30 at the insertion site I. In other examples, the substrate 550, the drug-carrying ring 552 and the layer of adhesive 554 may be replaced with one or more ring sections or partial rings that partially surround the insertable member 30 at the insertion site I. The drug-carrying ring 552 and the layer of adhesive 554 may be attached to the substrate 550 by any suitable securing mechanism or mechanisms including, but not limited to molding, co-molding with the substrate, adhesive, bonding, thermal bonding, sonic welding, or the like. In certain examples, the substrate 550, the drug-carrying ring 552 and the layer of adhesive 554 may be configured as a unit, as shown in FIG. 10, and then secured (as a unit) to the base 20, as shown in FIG. 9.

In the example in FIG. 9, the upper end of the channel or volume 20a of the base 20 is open, to selectively receive an insertion needle as described above. In other examples, the upper end of the channel or volume 20a in the example of FIG. 9 may be covered with a septum 50 as described above with regard to FIG. 2. Also, in the example in FIG. 9, the lower end of the channel or volume 20a of the base 20 is open to the channel or volume 20a as described above. In other examples, the lower end of the channel or volume 20a in the example of FIG. 9 may be covered with a septum 150, 250 or 350 as described above.

Figure 11:
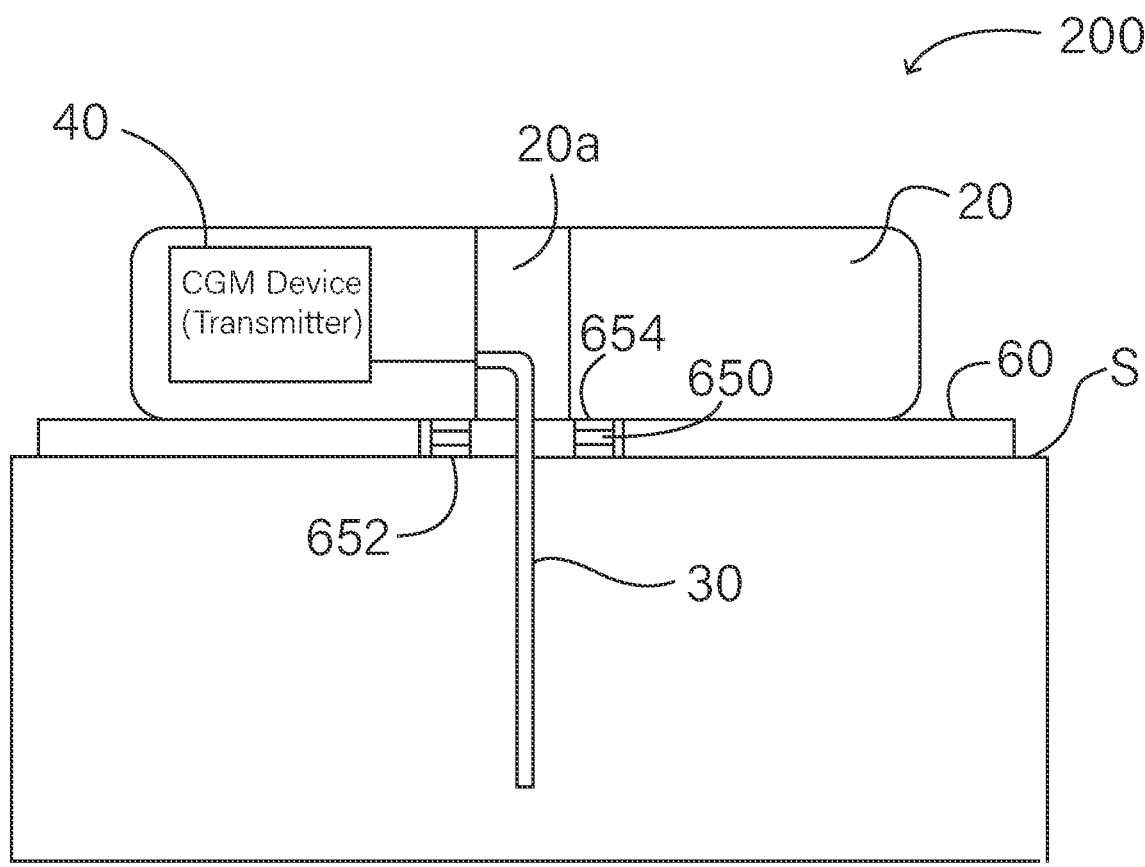
FIG. 11 is a cross-section view of another example of the medical device of FIG. 3.
Figure 12:
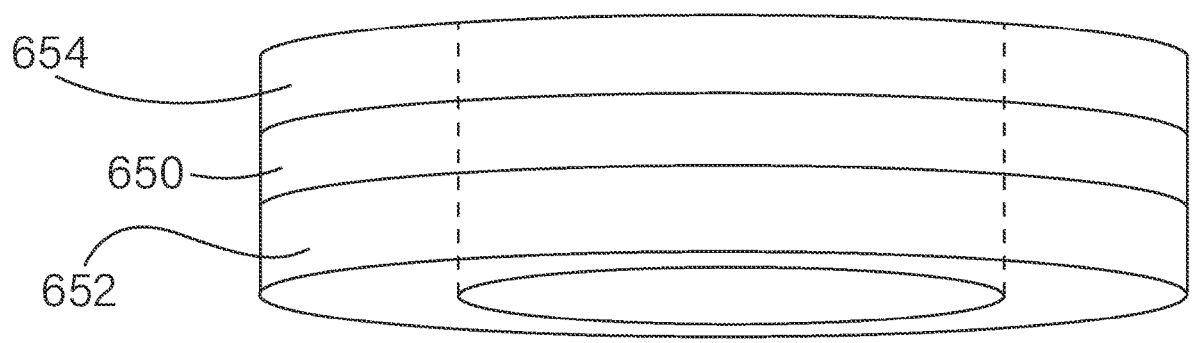
FIG. 12 is a cross-section view of another example of the medical device of FIG. 3.

In further examples, a layer of gauze or other absorbent material may be attached to or provided on the first surface 20a of the base 20. For example, FIGS. 11 and 12 each show the medical device 200 as described above with regard to the medical device 10 or the medical device 100, but with no septa 50, 150, 250, or 350. However, in FIGS. 11 and 12, a substrate 650 and a layer of gauze or other absorbent material 652 is secured to the skin-facing surface 20a of the base 20. In FIGS. 11 and 12, the substrate 650 is arranged between the layer of gauze or other absorbent material 652 and a layer of adhesive 654 such as, but not limited to a double-sided pressure sensitive adhesive, a glue, or another adhesive material, for adhering the substrate 650 to the first surface 20a of the base 20. In other examples, the substrate 650 may be attached to the first surface 20a by other securing mechanisms such as, but not limited to another bonding agent, thermal bonding, sonic welding, or the like. The substrate 650, the layer of gauze or other absorbent material 652 and the layer of adhesive 654 are located within the opening of the adhesive material layer 60.

The substrate 650 may be made of any suitably rigid material including, but not limited to a polyimide, PET or other suitable material. In other examples, the substrate 650 may be omitted and the layer of gauze or other absorbent material 652 may be secured directly to the layer of adhesive 654. The layer of gauze or other absorbent material 652 may be made of a gauze, foam, woven fabric or other absorbent material. The layer of gauze or other absorbent material 652 is configured to absorb and retain a limited amount of blood that may leak from the insertion site I. During use, the layer of gauze or other absorbent material 652 is located within the opening in the adhesive material layer 60, between the base 20 and the epidermal surface S, and, therefore, may be hidden from view from outside of the base 20. Accordingly, a limited amount of blood or other fluid absorbed by the layer of gauze or other absorbent material 652 may remain hidden from view.

Figure 13:
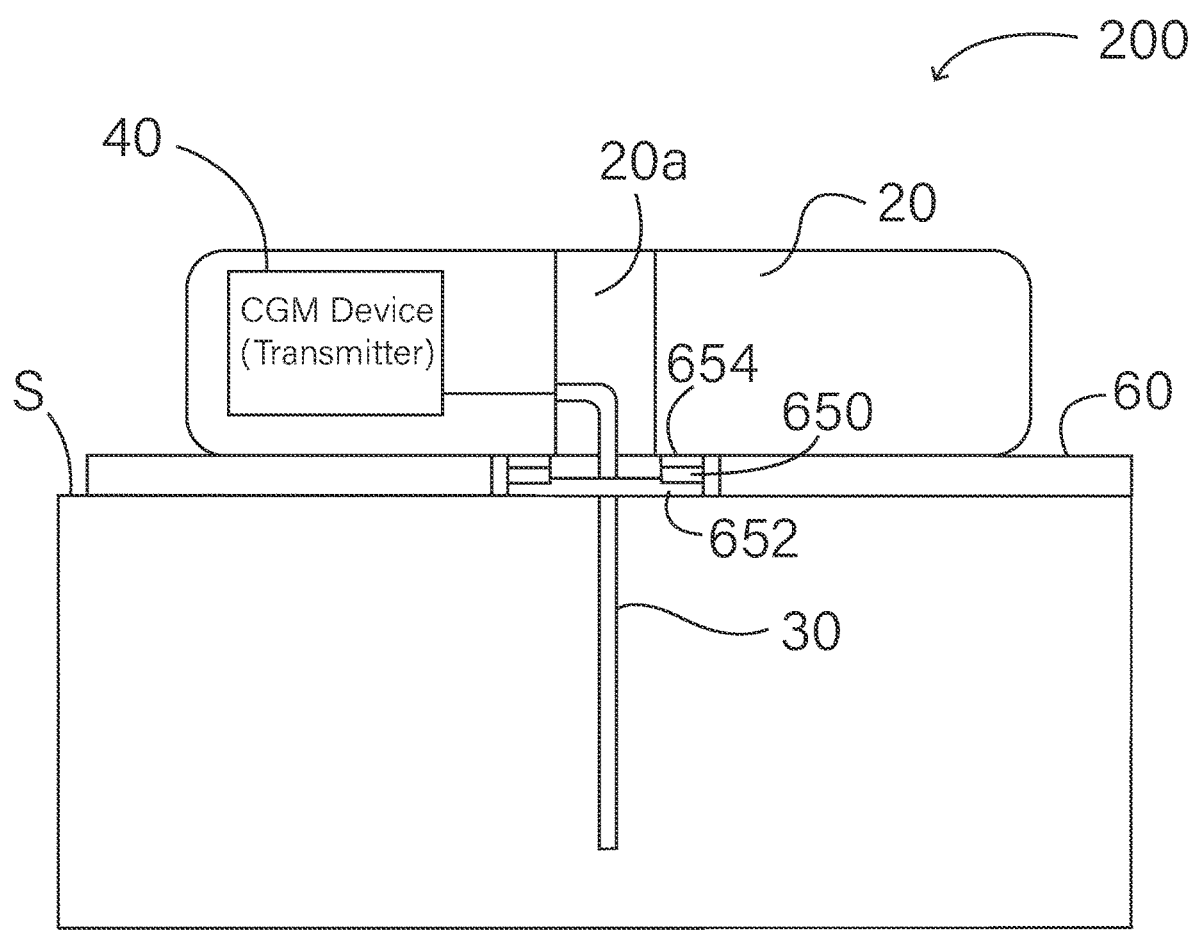
FIG. 13 is a perspective view of an example of an absorbent member of the medical device of FIG. 11.

In particular examples, the substrate 650, the layer of absorbent material 652, and the layer of adhesive 654 may each include an annular body forming a ring shape with corresponding diameters as shown in FIGS. 11 and 13. In other examples, the layer of absorbent material 652 may have a disc or plate shape and extends over the injection site I, but may be pierced through by the insertable member 30, as shown in FIG. 12. The substrate 650 and the layer of adhesive 654 (and, in some examples, the layer of absorbent material 652), each may have a central opening that aligns with each other and with the open end of the channel 20a, and through which the insertable member 30 extends.

Accordingly, the substrate 650 and the layer of adhesive 654 surround the insertable member 30 at the insertion site I. The layer of absorbent material 652 and the layer of adhesive 554 may be attached to the substrate 550 by any suitable securing mechanism or mechanisms including, but not limited to, molding, co-molding with the substrate, adhesive, bonding, thermal bonding, sonic welding, or the like. In certain examples, the substrate 650, the layer of absorbent material 652, and the layer of adhesive 654 may be configured as a unit, as shown in FIG. 13, and then secured (as a unit) to the base 20, as shown in FIG. 11 or FIG. 12.

In the examples in FIGS. 11 and 12, the upper end of the channel or volume 20a of the base 20 is open, to selectively receive an insertion needle as described above. In other examples, the upper end of the channel or volume 20a in the examples of FIGS. 11 and 12 may be covered with a septum 50 as described above with regard to FIG. 2. Also, in the examples in FIGS. 11 and 12, the lower end of the channel or volume 20a of the base 20 is open to the channel or volume 20a as described above. In other examples, the lower end of the channel or volume 20a in the examples of FIGS. 11 and 12 may be covered with a septum 150, 250 or 350 as described above.

While various exemplary embodiments have been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

We claim:

1. A medical device comprising:
a base having a needle channel and a first surface configured to be secured to a patient's skin;
an insertable member configured to be secured to the base with a length portion of the insertable member extending out of the needle channel at the first surface, for insertion through the patient's skin at an insertion site;
a septum extending across the needle channel, the septum having a body through which an insertion needle may be selectively extended to facilitate the subcutaneous insertion of the length portion of the insertable member, the septum providing a liquid seal across the needle channel;
an adhesive material layer attached to the first surface of the base, for securing the first surface of the base to the patient's skin, the adhesive material layer having an opening in alignment with the needle channel in the base;
an annular substrate located within the opening in the adhesive material layer and having an opening in alignment with the needle channel in the base and through which the insertable member extends when the insertable member is inserted through the patient's skin; and
an annular adhesive material layer provided on one side of the annular substrate for adhering the annular substrate to the first surface of the base;
wherein the needle channel and the septum provide a sealed volume in which a limited amount of blood or other fluid from the insertion site may be held.

2. The medical device of claim 1, further comprising wherein:
the base has a second surface facing opposite to the first surface, the needle channel extends through the base from the second surface to the first surface, and the septum is located at least partially in the needle channel at the second surface of the base.

3. The medical device of claim 1, wherein:
the base has a second surface facing opposite to the first surface, the needle channel extends through the base from the second surface to the first surface, and the septum is located at least partially in the needle channel at the first surface of the base.

4. The medical device of claim 3, wherein the septum comprises a piercable body having a valve configuration formed therein, for allowing passage of the insertion needle toward the patient's skin and inhibiting passage of fluid into the needle channel.

5. The medical device of claim 3, wherein the septum has a first surface that faces the patient's skin at the insertion site when the first surface of the base is secured to the patient's skin, and wherein a first material is held on the first surface of the septum, the first material comprising at least one of a hydrophilic material, a blood clotting material, or a pain reducing material.

6. The medical device of claim 5, further comprising an annular body attached to the first surface of the septum and having an opening in alignment with the needle channel in the base, the annular body being impregnated or coated with the first material, or having a layer of the first material.

7. The medical device of claim 1, wherein:
the annular substrate is impregnated or coated with at least one of a hydrophilic material, a blood clotting material, or a pain reducing material, or having a layer of at least one of a hydrophilic material, a blood clotting material, or a pain reducing material that at least partially surrounds the insertion site.

8. The medical device of claim 1, wherein the septum comprises a piercable body.

9. The medical device of claim 1, wherein the insertable member comprises one or more of a sensor probe, a cannula, a needle, or an electrical stimulus delivery device.

10. A medical device comprising:
a base having a needle channel and a first surface configured to be secured to a patient's skin;
an insertable member configured to be secured to the base with a length portion of the insertable member extending out of the needle channel at the first surface, for insertion through the patient's skin at an insertion site;
a septum extending across the needle channel, the septum having a body through which an insertion needle may be selectively extended to facilitate the subcutaneous insertion of the length portion of the insertable member, the septum providing a liquid seal across the needle channel;
wherein the needle channel and the septum provide a sealed volume in which a limited amount of blood or other fluid from the insertion site may be held;
an adhesive material layer attached to the first surface of the base, for securing the first surface of the base to the patient's skin, the adhesive material layer having an opening in alignment with the needle channel in the base;
an annular substrate located within the opening in the adhesive material layer and having an opening in alignment with the needle channel in the base and through which the insertable member extends when the insertable member is inserted through the patient's skin; and
a layer of gauze or other blood absorbing material attached to a skin-facing surface of the annular substrate.

11. The medical device of claim 10, further comprising an annular adhesive material layer provided on a side of the annular substrate opposite to the skin-facing side for adhering the annular substrate to the first surface of the base, the annular adhesive material layer having an opening in alignment with the channel in the base.

12. A medical device comprising:
a base having a needle channel and a first surface configured to be secured to a patient's skin;
an adhesive material layer attached to the first surface of the base, for securing the first surface of the base to the patient's skin, the adhesive material layer having an opening in alignment with the needle channel in the base;
an insertable member configured to be secured to the base with a length portion of the insertable member extending out of the needle channel at the first surface and through the opening in the adhesive material layer, for insertion through the patient's skin at an insertion site;
an annular substrate located within the opening in the adhesive material layer and having an opening in alignment with the needle channel in the base and through which the insertable member extends when the insertable member is inserted through the patient's skin; and an annular adhesive material layer provided on one side of the annular substrate for adhering the annular substrate to the first surface of the base;
wherein the annular substrate is impregnated or coated with a first material, has a layer of the first material, or is attached to a layer of gauze or other absorbent material, that at least partially surrounds or covers the insertion site, and wherein the first material comprises at least one of a hydrophilic material, a blood clotting material, or a pain reducing material.

13. The medical device of claim 12, further comprising a septum located in the needle channel, wherein the needle channel and the septum provide a sealed volume in which a limited amount of blood or other fluid from the insertion site may be held.

14. The medical device of claim 13, wherein the septum comprises a piercable body.

15. The medical device of claim 12, wherein the insertable member comprises one or more of a sensor probe, a cannula, a needle, or an electrical stimulus delivery device.

16. A method of making a medical device, the method comprising:
providing a base having a needle channel and a first surface configured to be secured to a patient's skin;
securing an insertable member to the base with a length portion of the insertable member extending out of the needle channel at the first surface, for insertion through the patient's skin at an insertion site;
extending a septum across the needle channel, the septum having a body through which an insertion needle may be selectively extended to facilitate the subcutaneous insertion of the length portion of the insertable member, the septum providing a liquid seal across the needle channel;
attaching an adhesive material layer to the first surface of the base, for securing the first surface of the base to the patient's skin, the adhesive material layer having an opening in alignment with the needle channel in the base;
attaching an annular substrate within the opening in the adhesive material layer, the annular substrate having an opening in alignment with the needle channel in the base and through which the insertable member extends when the insertable member is inserted through the patient's skin; and
providing an annular adhesive material layer on one side of the annular substrate for adhering the annular substrate to the first surface of the base;
wherein the needle channel and the septum provide a sealed volume in which a limited amount of blood or other fluid from the insertion site may be held.

17. The method of claim 16, wherein:
the base has a second surface facing opposite to the first surface, the needle channel extends through the base from the second surface to the first surface.

18. The method of claim 16, further comprising:
coating the annular substrate with at least one of a hydrophilic material, a blood clotting material, or a pain reducing material, or supporting a layer of at least one of a hydrophilic material, a blood clotting material, or a pain reducing material on the annular substrate to at least partially surrounds the insertion site.

* * * * *